United States Patent [19]

Nanba

[11] Patent Number: 4,590,837
[45] Date of Patent: May 27, 1986

[54] SAW TEETH FOR HAND SAWS

[76] Inventor: Taro Nanba, 410-3, Ishigama, Sanjo-shi, Niigata-ken, Japan

[21] Appl. No.: 535,155

[22] Filed: Sep. 23, 1983

[30] Foreign Application Priority Data

Dec. 22, 1982 [AU] Australia ............................. PF7376

[51] Int. Cl.⁴ ..................... B23D 57/00; B27B 33/02
[52] U.S. Cl. ...................................... 83/846; 83/854
[58] Field of Search ............... 83/848, 849, 854, 835, 83/846, 847, 849, 850, 851, 852

[56] References Cited

U.S. PATENT DOCUMENTS

| 400,057 | 3/1889 | Clemson | 83/850 |
| 514,207 | 2/1894 | Bott | 83/854 |
| 1,381,478 | 6/1921 | Lawrence | 83/852 |
| 2,141,504 | 12/1938 | Balfour et al. | 83/846 |
| 2,635,327 | 4/1953 | Enlow | 83/850 |
| 4,179,967 | 12/1979 | Clark | 83/846 |
| 4,339,977 | 7/1982 | Miller | 83/851 |

FOREIGN PATENT DOCUMENTS

| 465060 | 5/1950 | Canada | 83/835 |
| 29425 | 3/1968 | Japan | 83/852 |
| 93437 | 11/1938 | Sweden | 83/852 |
| 2100187 | 12/1982 | United Kingdom | 83/849 |
| 493350 | 3/1976 | U.S.S.R. | 83/835 |

Primary Examiner—Frederick R. Schmidt
Assistant Examiner—J. T. Zatarga
Attorney, Agent, or Firm—John E. Reilly

[57] ABSTRACT

A saw blade has a series of triangular saw teeth, each tooth having a cutting edge and back edge joined by a tip edge with a cutting angle tapered rearwardly from the front cutting edge. The cutting angles of the cutting edges are progressively reduced from the leading end to the trailing end. Additionally, the teeth may be formed of a combination of laterally projected teeth and straight teeth.

1 Claim, 6 Drawing Figures

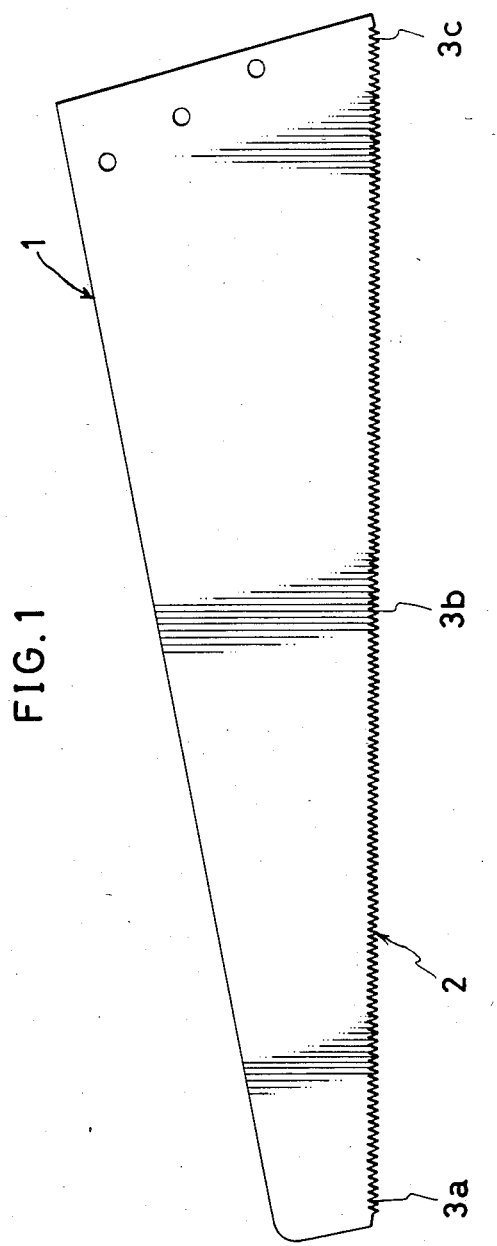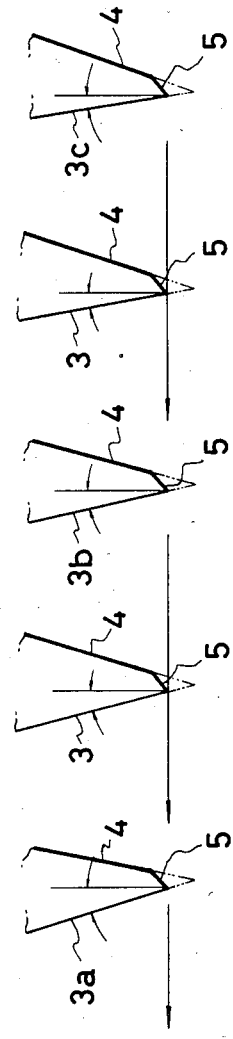
FIG. 1
FIG. 2

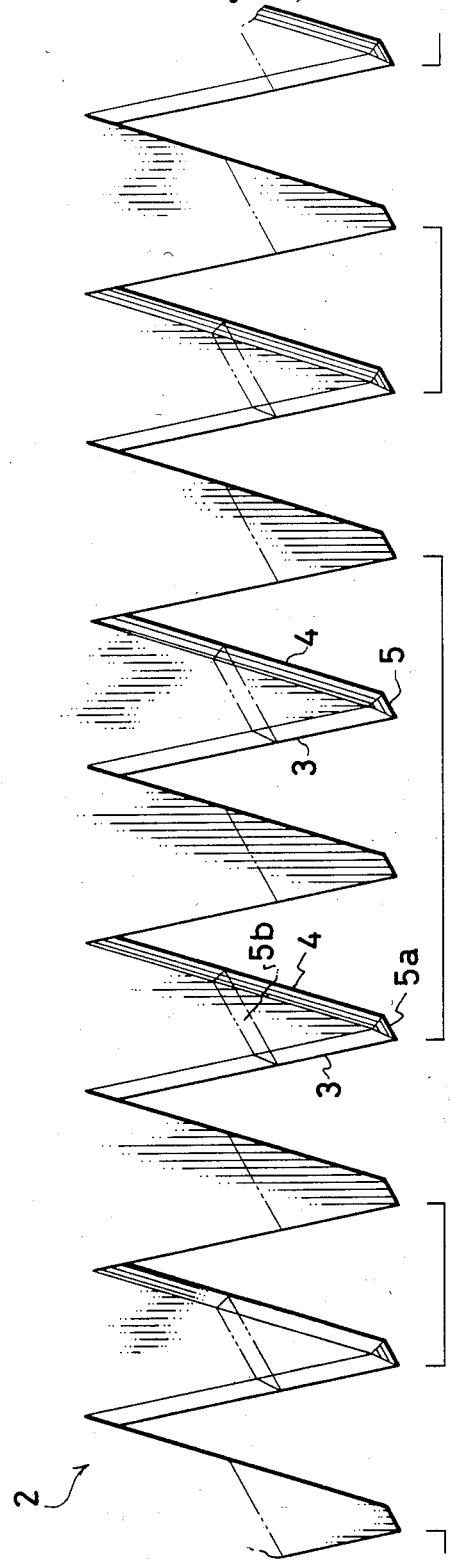
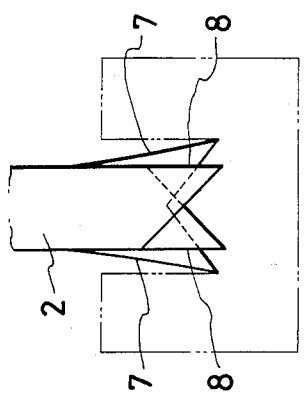
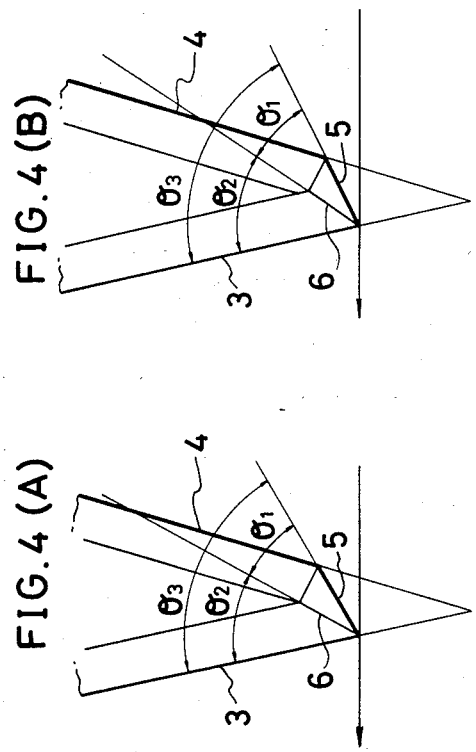
FIG. 3
FIG. 4(A)
FIG. 4(B)
FIG. 5

SAW TEETH FOR HAND SAWS

This invention relates to a novel and improved saw; and more particularly relates to a hand saw having novel and improved saw teeth.

BACKGROUND AND FIELD OF THE INVENTION

Conventional push-type saws have the disadvantage of inferior cutting ability. Specifically, the cutting edges are shaped at constant angles of approximately 15° along the length of the saw. Secondly, all of the cutting edges are projected laterally or in a sideward direction; and thirdly, the tip of each saw tooth is of triangular form.

SUMMARY OF THE INVENTION

It is an object of the present invention to provide for a novel and improved saw characterized by having saw teeth with high cutting ability, excellent durability and sawing speed.

Another object of the present invention is to provide in a saw for novel and improved saw teeth in which sawing resistance is reduced at the leading and intermediate portions of the saw blade.

A further object of the present invention is to provide a saw blade for hand saws and the like which can be easily maintained and is characterized by increased sawing strength and durability.

In accordance with the present invention, there has been devised in a preferred embodiment, a novel and improved saw blade for hand saws and the like which includes cutting edges whose cutting angles are gradually reduced from a leading portion to a base or trailing portion along its length. Tipped edges are shaped in an inclined plane and the tips of the saw teeth, there being a combination of sideward or laterally projecting teeth and straight teeth established on the ratio of 2:1 or 3:1. Most desirably, the cutting edges vary from a cutting angle of 16° to 17° at the leading portion of the saw blade to an angle of 12° to 13° at an intermediate portion and are in the range of 8° to 9° at the trailing portion, the surface angle of the tip edge formed between the cutting edge and back edge of each tooth being on the order of 30°, and the cutting edge angle between the side of the cutting edge and a ridge line between the tip edge and cutting edge being on the order of 40° to 45°.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is an elevational view of a whole saw blade;

FIGS. 2 and 3 are enlarged elevational views of essential portions of the saw blade of FIG. 1;

FIG. 4(A) is an enlarged elevational view of a part of essential portions of the saw blade of FIG. 1;

FIG. 4(B) is an enlarged elevational view of a part of essential portions of another embodiment; and FIG. 5 is a side view of the essential portion of the saw blade of FIG. 1.

DETAILED DESCRIPTION OF THE PREFERRED EMBODIMENT

Referring in more detail to the drawings, the present invention comprises a saw blade 1 having formed along one edge a plurality of saw teeth 2, each tooth being substantially triangular in side elevation and having a leading edge or cutting edge 3 and a trailing edge or back edge 4, the leading edge and trailing edge of each tooth 2 being chamfered to define a sharpened cutting edge. As shown in FIG. 3, the leading and trailing edge of each tooth is chamfered on the same side of the saw blade with a first group of teeth in which the chamfering is on a first side of the saw blade 1 and a second group of teeth in which the chamfer is on the other side of the saw blade 1, each tooth being set such that the unchamfered side of each tooth is the side distal to the plane of the saw, and each tooth being chamfered at its apex from its leading edge to its trailing edge to define a tipped edge 5.

According to the present invention, saw teeth 2 of a saw blade 1 are configured in a shape whereby cutting edges 3 are arranged so that their inclination angles are gradually reduced in a range of 16° to 17° to 8° or 9° in a direction of advancement of the saw blade 1 from the leading end portion 3a to the base or trailing end portion 3c thereof. In other words, in FIGS. 1 and 2, the inclination angle of the cutting edge 3a in the leading end portion is 16° or 17°, that of the cutting edge at the intermediate portion 3b is 12° or 13°, and that of the cutting edge at the trailing end portion 3c is 8° or 9°. Thus, the first characteristic of the present invention is such that the cutting edges 3 of the saw teeth 2 are arranged so that all their inclination angles are changed gradually and slightly. This variation of the inclination angles can be achieved mechanically and automatically. A back edge 4 is provided on one side of a triangle whose opposite side is provided with the cutting edge 3, both the edges 3 and 4 being arranged in the same plane. A saw tooth 2 consists of a pair of the cutting edge 3 and back edge 4. The saw teeth 2 are continuously arranged so that they are alternately projected sideward, right and left sides away from the plane of the saw blade, as shown in FIG. 5.

A truncated tip edge 5 is formed in an inclined plane by cutting, at an angle, a tip of the saw tooth 2 where imaginary lines along the another cutting edge 3 and back edge 4 intersect one. As best seen from FIGS. 4(A) and 4(B), a surface angle $\theta_1$ of the tip edge 5 is 30° to a ridgeline 6, and a cutting edge angle $\theta_2$ between a side of cutting edge 3 and the ridgeline 6 between the tip edge 5 and cutting edge 3 is 40° to 45° so that the sum of the substantial cutting angle $\theta_3$ of the saw teeth 2 becomes 70° to 75°. FIG. 4(A) is an example of a cutting edge angle $\theta_2$ which is 40° for sawing a soft wood, and FIG. 4(B) is an example where a cutting edge angle $\theta_2$ is 45° for sawing a hard wood.

According to the present invention in which the tip edge 5 is included, the required cutting angle of the cutting edge 3 can be maintained by grinding the tip edge 5 with a file, this cutting angle being tapered rearwardly from the cutting edge. The position of the tip edge is gradually shifted from 5a to 5b as shown by imaginary lines in FIG. 3 as a result of grinding the tip edges 5 with a file when necessary. Thus, by recutting the saw teeth as described above, the angle of the cutting edge angle $\theta_2$ can be kept constant, although the size of the tip edge 5 is increased accordingly. Therefore, high cutting ability of the saw can be maintained without deterioration. In short, the second characteristic of the present invention is the presence of the tip edges 5 at the saw teeth 2.

Furthermore, according to the present invention, alternately sideward projected saw teeth and straight saw teeth are arranged at suitable intervals. It is most desirable to arrange the number of laterally projected teeth 7 to the number of straight teeth 8 at the ratio of 2:1 to 3:1 when a pair of front- and back-shaped teeth are regarded as a unit. In an embodiment of the invention shown in FIG. 3, this ratio is 2:1.

As described above, the third characteristic of the present invention is the saw teeth arrangement in which the projected teeth 7 and straight teeth 8 are formed at suitable intervals. According to the present invention, first the saw teeth 2 are normally arranged so that the cutting angles of a series of cutting edges 3 are gradually or progressively reduced one by one from the leading portion 3a to the base or trailing portion 3c, thus achieving smooth sawing by reducing sawing resistance at the leading and intermediate portions of the saw blade, both portions having the least strength against sawing. Second, all saw teeth have the tip edges 5 in addition to the cutting edges 3, thereby increasing sawing strength and durability, and maintaining the same cutting angle for a long period by grinding only the tip edges with a file. Third, in the arrangement by which the laterally projected teeth are formed at the ratio of 2:1 or 3:1 when a pair of front- and back-shaped teeth are regarded as a unit, sawing resistance can be reduced in crosscut sawing, oblique sawing and ripsawing, and sawing speed can be increased for efficient, easy sawing.

Since the saw according to the present invention includes the saw teeth having the above-mentioned three characteristics, high cutting ability, excellent durability and high sawing speed can be achieved because of the combined effect of the three characteristics, thus providing remarkable practical sawing advances.

It is therefore to be understood that while a preferred embodiment of a method and apparatus have been herein set forth and described, various modifications and changes may be made therein without departing from the spirit and scope of the present invention as defined by the appended claims.

I claim:

1. In a hand-saw, a saw blade having saw teeth including cutting edges whose cutting angles are progressively reduced from a leading end portion to a trailing end portion of said blade, each cutting edge having a cutting angle at said leading portion of said saw blade in the range of 16° to 17°, a cutting angle at an intermediate portion thereof in the range of 12° to 13°, and a cutting angle at said trailing portion thereof in the rainge of 8° to 9°, a truncated, rearwardly tapered tip edge traversing the full width of each saw tooth having an angle on the order of 30°, a ridge line formed between each said tip edge and said cutting edge, said ridge line being on the order of 40° to 45°, said tip edge joining each cutting edge and back edge, and the included angle between said back edge and said ridge line being less than the included angle between said cutting edge and said ridge line.

* * * * *